(12) United States Patent
Yamane et al.

(10) Patent No.: US 7,717,517 B2
(45) Date of Patent: May 18, 2010

(54) HEADREST FOR VEHICLES

(75) Inventors: Takeshi Yamane, Okayama (JP);
Tokuzo Kobayashi, Okayama (JP);
Akihiko Okamoto, Okayama (JP)

(73) Assignee: Bizen Hatsujoh Co., Ltd., Okayama (JP)

( * ) Notice: Subject to any disclaimer, the term of this patent is extended or adjusted under 35 U.S.C. 154(b) by 23 days.

(21) Appl. No.: 12/148,958

(22) Filed: Apr. 24, 2008

(65) Prior Publication Data

US 2008/0277989 A1 Nov. 13, 2008

(30) Foreign Application Priority Data

Apr. 28, 2007 (JP) ............... 2007-120368

(51) Int. Cl.
*A47C 1/10* (2006.01)
(52) U.S. Cl. ...................... 297/408; 297/391
(58) Field of Classification Search .................. 297/408, 297/391
See application file for complete search history.

(56) References Cited

U.S. PATENT DOCUMENTS

| 4,674,797 | A | * | 6/1987 | Tateyama | 297/408 |
| 5,669,668 | A | * | 9/1997 | Leuchtmann | 297/408 |
| 6,000,760 | A | * | 12/1999 | Chung | 297/408 |
| 6,129,421 | A | * | 10/2000 | Gilson et al. | 297/408 |
| 7,234,778 | B1 | * | 6/2007 | Toba | 297/403 |
| 7,325,877 | B2 | * | 2/2008 | Brockman et al. | 297/408 |
| 7,341,312 | B2 | * | 3/2008 | Gauthier et al. | 297/408 |
| 7,455,363 | B2 | * | 11/2008 | Chung | 297/407 |
| 7,540,535 | B2 | * | 6/2009 | Kasubke | 280/756 |
| 2005/0088027 | A1 | * | 4/2005 | Yetukuri et al. | 297/408 |
| 2006/0226689 | A1 | * | 10/2006 | Linnenbrink et al. | 297/408 |
| 2007/0164593 | A1 | * | 7/2007 | Brockman | 297/408 |

FOREIGN PATENT DOCUMENTS

| JP | 5-48750 | 6/1993 |
| JP | 2006-264431 | 10/2006 |

* cited by examiner

*Primary Examiner*—David Dunn
*Assistant Examiner*—Erika Garrett
(74) *Attorney, Agent, or Firm*—William L. Androlia; H. Henry Koda

(57) ABSTRACT

A headrest for vehicles including a stationary plate secured to the seat back of a vehicle; an attachment shaft supported by the stationary plate; a coil spring wound on the attachment shaft and having a fixed end and a free end with its inner diameter being smaller than the outer diameter of the attachment shaft; and a headrest base plate attached to the stationary plate so as to turn forward and rearward. The fixed end of the coil spring is fixed to the base plate so as to secure the attachment shaft to the base plate or the fixed end of the coil is fixed to the stationary plate so as to secure the attachment shaft to the base plate, and the winding direction of the coil spring is set in a direction that tightens the spring when the base plate is turned rearward, thus restricting this rearward turning.

7 Claims, 14 Drawing Sheets

FIG. 9(a)
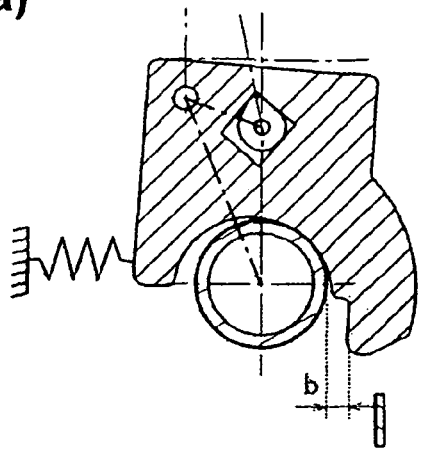
FIG. 9(b)
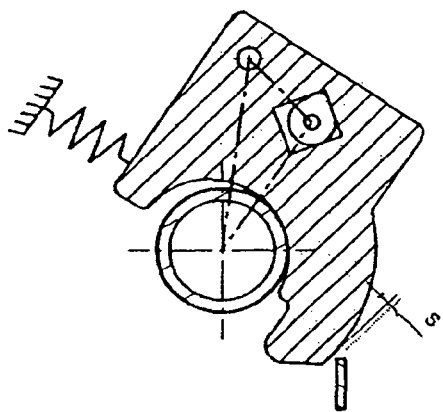
FIG. 9(c)
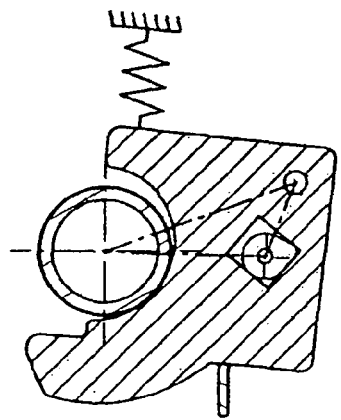

HEADREST FOR VEHICLES

BACKGROUND OF THE INVENTION

1. Field of the Invention

The present invention relates to a headrest attached to a seat back of a vehicle seat, and more particularly to a headrest mounted on a seat back for the front passenger seat or rear seat.

2. Description of the Related Art

A headrest will be comfortable if the angle of forward inclination thereof can be finely adjusted to match the passenger's physique or the like. It is also convenient if the sides of the passenger's head are supported together with the back of the head in cases such as when the seat is reclined. Furthermore, if the headrest can be moved forward and rearward, it will be even easier to adjust to the passenger's physique or the like. In addition, for a front passenger seat or a rear seat, when there is no passenger sitting therein, the driver's field of view being blocked can be prevented if the headrest is folded up or retracted. Such a configuration is disclosed in, for example, Japanese Utility Mode Application Laid-Open (Kokai) No. 5-048750; however, the headrest disclosed in this publication is very complex in structure and high in cost. In the headrest disclosed in Japanese Patent Application Laid-Open (Kokai) 2006-264431, the headrest can be moved or tilted using an electric motor; however, the structure of this headrest also requires many numbers of members and parts, and the headrest is expensive.

In a construction in which a headrest is made to move or tilt, in the interest of safety, it is necessary to make provision so that it does not move when a rearward or quartering rearward force is applied. For this purpose, in Japanese Utility Mode Application Laid-Open (Kokai) No. 5-048750, a ratchet mechanism having engagement teeth is used. However, in this structure, a manipulation, using a manipulating member, is required to engage or disengage a latching body for latching the engagement teeth, and the latching position is limited to the position of the tooth surfaces of the engagement teeth (stepwise); as a result, stepless-fashion fine adjustments cannot be made, which is a drawback.

In general, when a coil spring having an inner diameter smaller than the diameter of a shaft is wound about this shaft, the properties are such that, if the shaft or the coil spring is turned in a direction in which the coil spring tightens, the coil spring tightens down on the shaft and turning is restricted (or movement is very heavy), whereas, if, on the other hand, the shaft or coil spring is turned in the opposite direction, then the coil spring will turn freely (or very lightly), sliding over the shaft. For convenience, this structure is, hereinafter, called a coil spring type torque limiter. This coil spring type torque limiter has advantages in that the structure is simple and inexpensive, and in that, merely by turning the coil spring in the loosening direction, the initial position (phase) can be adjusted in a stepless manner.

BRIEF SUMMARY OF THE INVENTION

With the above in mind, it is an object of the present invention to provide a headrest, in which, with an employment of the characteristics of a coil spring type torque limiter, the headrest can receive a rearward direction strong force and can easily be finely adjusted by being capable of turning with a light force in the forward direction, so that the position of the head-receiving member of the headrest can be finely adjusted to accord with the passenger's physique.

It is another object of the present invention to provide a headrest that is foldable so as not to interfere with the visual range of the driver when no passenger is on board, and, in addition, it includes a fewer members and parts so that the headrest is inexpensive. With respect to this point, the same is true for a so-called butterfly-type headrest in which the side parts of a headrest can be turned horizontally, in order to alleviate fatigue in the neck and the like of a passenger, supporting the sides of the head of the passenger, during long-distance movement or napping or the like, in addition to fore and aft tilting.

The above-described object are accomplished by a unique structure of the present invention for a headrest for vehicles that includes a stationary plate secured to a seat back; an attachment shaft supported by the stationary plate; a coil spring wound about the attachment shaft, two ends of the coil spring being, respectively, a fixed end and a free end and an inner diameter of the coil spring being smaller than an outer diameter of the attachment shaft; and a headrest base plate attached to the stationary plate so that it is turnable forward and rearward relative to the stationary plate; and in the present invention:

the fixed end of the coil spring is provided on the base plate so that the attachment shaft is secured to the stationary plate or the fixed end of the coil spring is provided on the stationary plate so that the attachment shaft is integral with the base plate;

a winding direction of the coil spring is set in a direction that tightens the spring by a rearward turning of the base plate, thus restricting the rearward turning of the base plate;

a release member for moving the free end of the coil spring in a direction that loosens the free end of the coil spring to release the restriction on the rearward turning of the base plate is provided on the base plate;

the base plate turns through an angle adjustment range, which is from an initial position above the seat back to an adjustment limit position fixedly inclined forward, and further to a retracting position that exceeds the angle adjustment range in the forward direction;

the stationary plate is provided with a control plate; and the base plate is provided with a control member which is linked to the release member for acting on the control plate and allowing or restricting the turning of the base plate from the initial position to the retracting position.

In the headrest of the present invention described above, an elongated groove (angle adjusting groove) that corresponds to the angle adjustment range and a groove (retracting groove) corresponding to the retracting position are formed in the control plate; a control rod, capable of being inserted into and withdrawn from the elongated groove and groove is attached to the control member; so that when the control rod is withdrawn from the elongated groove by the control member, the base plate can be turned as far as the retracting position, exceeding the angle adjustment range; and when the control rod is inserted in the elongated groove, it functions as a stopper at the forward end and rearward end of the angle adjustment range, and when the control rod is inserted into the groove, the base plate is held at the retracting position.

Furthermore, in the headrest described above, the stationary plate or the attachment shaft is provided with a cam member which acts on the free end of the coil spring, the cam member having an inclined part for loosening the coil spring and a key-shaped part for returning the loose condition to an original condition; the base plate is provided with a latching member for holding the loose condition of the coil spring; wherein when the base plate moves beyond the adjustment limit position, the coil spring is held in the loose condition by the action of the latching member and of the inclined part of the cam member; and when the base plate returns to the initial position, the original condition of the coil spring is restored by the key-shaped part of the cam member.

Furthermore, in the headrest of the present invention, two coil springs having a same winding direction can be provided so that both a forward turning and a rearward turning of the base plate are restricted; and a release member can be further provided in the base plate for moving respective free ends of the coil springs in a loosening direction and releasing the restriction on the forward and rearward turning of the base plate.

In the headrest of the present invention as described above, a restricting plate linking to the control member is further attached to the base plate so as to be able to turn and so as to be movable rearward relative to the attachment shaft; a restricting piece, which acts on the restricting plate, is further attached to the stationary plate; so that when the control member is manipulated to move the restricting plate rearward and cause the base plate to turn forward, even should the base plate have come to the adjustment limit position, the restricting plate will pass over the restricting piece and permit turning to the retracting position; and, when the base plate comes to the retracting position, the front edge of the restricting plate will come up against the restricting piece to restrict further turning thereof.

Furthermore, in the present invention, the base plate may have a movable shaft(s) that is linked by a link to the attachment shaft, and the movable shaft(s), by the link, may be capable of making a forward movement relative to the attachment shaft, so that the attachment shaft(s) functions as the attachment shaft.

In addition, in the present invention, when the headrest is comprised of a head-receiving member and side parts, the head-receiving member corresponds to the stationary plate described above, and attachment shaft are provided in a longitudinal direction and the head-receiving member and the base plate are pivotally mounted thereon; and, in this structure the base plate can be the head-receiving member.

In the headrest of the present invention as described above, the main functional parts are the stationary shaft and the coil spring; as a result, the structure is simple and manufacture can be done at low cost. Furthermore, the angular adjustment of the base plate can be done in a stepless fashion, and, when a large force is acted on the base plate, rearward turning is restricted, so that the safety is secured. In the structure of the present invention, consideration is given to the restricting force and the manipulation force during the angular adjustment when establishing the relationship between the inner diameter of the coil spring and the outer diameter of the stationary shaft; however, when the inner diameter of the coil spring is made 2 to 4% smaller than the diameter of the stationary shaft as in the present invention, the forward turning of the headrest during the angular adjustment can be done with a light force, and the rearward turning also can be made even though some greater level of force is required. Nevertheless, an adequate resisting force can be derived against the normal load pushing the head rearward. In addition, because the rearward turning restricting force can be released, when rearward turning is necessary during the angular adjustment, it can be accomplished with an extremely light force. Furthermore, the angle adjustment range and the retracting position can be switched by the control member; and when a necessary release manipulation is required, it can be done with a link to the release member. In addition, in the present invention, when the restriction is released or the spring is loosened, the rearward turning of the headrest becomes easier, and forward and rearward angular adjustments can be made with a light one-touch force by turning the base plate only, without applying a manipulation for loosening the coil spring.

Furthermore, in the headrest of the present invention that includes two coil springs, one coil spring restricts the forward turning of the base plate, while the other coil spring restricts the rearward turning thereof; as a result, both the forward and rearward turning can be restricted, and the safety of the passenger is assured against shocks resulting from a collision or emergency braking (the forces caused thereby operate both rearward and forward). Meanwhile, by turning the free ends of the respective coil springs toward the loosening side by the release member, the restrictions on both the forward turning and rearward turning of the base plate can be released. In this structure, the turning of the base plate is definitely restricted by the front end and back end of the angle adjustment range. As a result, the safety of the passenger against the shocks of a collision or emergency braking is secured, and assured holding in the retracting position can be secured.

Furthermore, in the headrest of the present invention, in addition to the adjustment for the angle of the headrest, fore and aft movement of the headrest is also adjustable. Accordingly, it is possible to comply with the passenger's physique or the like even better. Furthermore, when the passenger puts the seat back down and reclines, his or her head is prevented from falling off the headrest by the side parts of the headrest. In addition, the base plate (head-receiving member) has a function to make fore and aft tilting.

BRIEF DESCRIPTION OF THE SEVERAL VIEWS OF THE DRAWINGS

FIGS. 9(a) through 9(c) are explanatory illustrations showing how the angular adjustments are made in the headrest shown in FIG. 6;

DETAILED DESCRIPTION OF THE INVENTION

Embodiments of the present invention will be now described with reference to the accompanying drawings.

Figure 1:
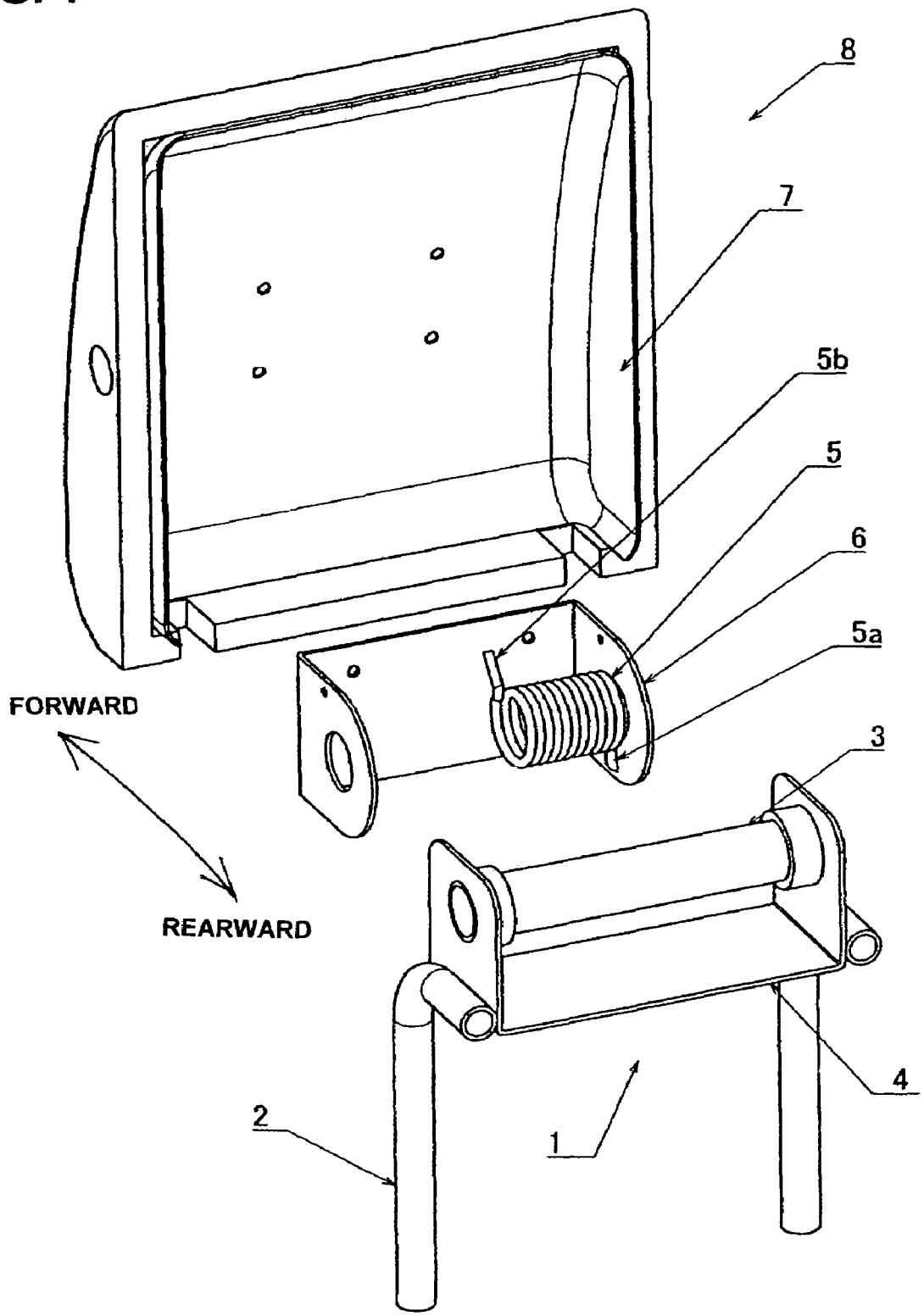
FIG. 1 is an exploded perspective view of a headrest according to the present invention.
Figure 2:
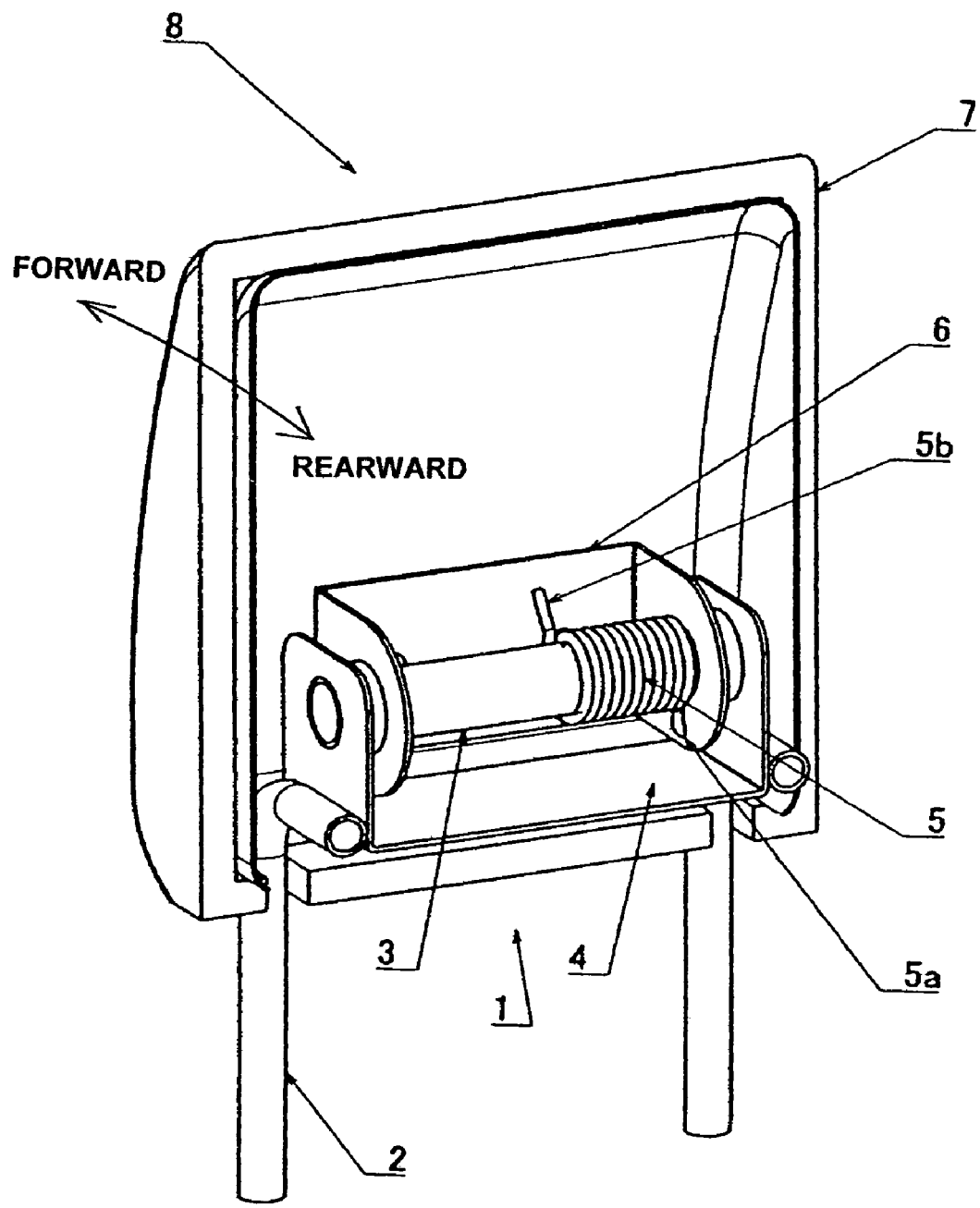
FIG. 2 is a perspective view of a headrest of the present invention in the assembled condition.

FIG. 1 is an exploded view of a headrest of the present invention, while FIG. 2 shows the assembled condition thereof. The headrest 8 of this example comprises: an attachment shaft 3 that is secured, so as to be oriented left and right (horizontally), to a stationary plate 4 which is attached integrally to a pair of left and right supporting pillars 2 that are inserted into the upper end of an automobile seat back 1; a base plate 6 that makes a core of a head-receiving member 7 which is fitted on the attachment shaft 3 so that the head-receiving member 7 can turn relative to the attachment shaft 3; and a coil spring 5 that is wound about the attachment shaft 3.

In this structure, the coil spring 5 is turnable together with the base plate 6, with one end of the coil spring 5 being a free end 5b, and the other end being a fixed end 5a that is secured to the base plate 6. The dimensional difference between the inner diameter of the coil spring and the outer diameter of the attachment shaft 3 greatly affects how the turning of the base plate 6 is restricted or allowed. The smaller this dimensional difference, the more strongly will the restricting force operate, and a large force will be required for the manipulation force. Conversely, the larger the difference, the more the reverse of this will be true. In general, in the headrest 8, the inner diameter of the coil spring 5 is set to be smaller than the outer diameter of the attachment shaft 3 by 2 to 4% or so.

How the headrest 8 of the above-described configuration works will be described below.

When the base plate 6 that is a part of the head-receiving member 7 is turned forward so as to make an angular adjustment of the headrest, the coil spring 5 is turned in its loosening direction; as a result, the adjustment is made with a comparatively light force. On the other hand, when a rearward turning is made by a push of the head of a passenger or the like, since the coil spring 5 is turned in its tightening direction, the turning is restricted. Here, by "turning is restricted," it is meant not that there can absolutely be no movement made, but rather that a resisting force will be derived such that the movement will not occur readily with a small force. Because the angular adjustment of the headrest includes not only a forward turning but also a rearward turning of the base plate 6 of head-receiving member 7, by exerting a somewhat large force, angular adjustments toward the rear can also be made; and this is possible because the dimensional difference between the inner diameter of the coil spring 5 and the outer diameter of the attachment shaft 3 bears the relationship described above in the present invention.

The movements described above are made possible because one of the attachment shaft 3 and one end of the coil spring 5 is secured, while the other can be turned. As a result, though not shown in the accompanying drawings, the coil spring 5 can be secured while the attachment shaft 3 is made so as to turn. In order to effect this, it is only necessary to secure the coil spring 5 by, for example, securing the fixed end 5a of the coil spring 5 to the stationary plate 4, thus making the attachment shaft 3 integral with the base plate 6 so that the attachment shaft 3 is made to turn together with the base plate 6 relative to the stationary plate 4.

Figure 3:
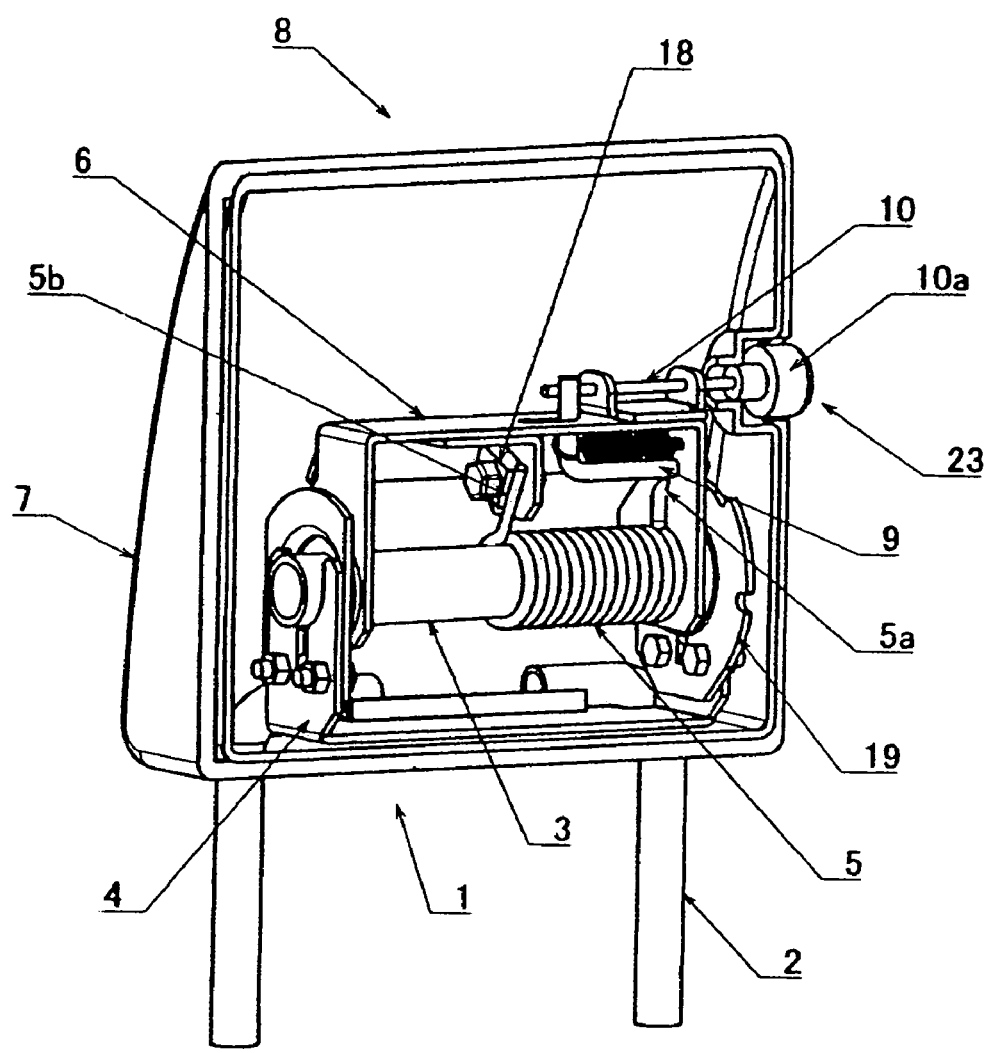
FIG. 3 is a perspective view of another example of the headrest according to the present invention.

FIG. 3 is a perspective view of another example in which the attachment shaft 3 described above is secured or made stationary.

In this example, however, in addition to the structure described above, the tightening and loosening of the free end 5b of the coil spring 5 is made adjustable relative to the attachment shaft 3. More specifically, an adjustment member 18 for which the distance from the center differs is attached to the base plate 6; and by changing the angle of this attachment, the position of the free end 5b is adjusted fore and aft. If this free end 5b is moved in the direction in which the coil spring 5 loosens, the configuration becomes similar to that described above in which the dimensional difference has become large, the manipulation force required during angular adjustment is small, and, if moved in the tightening direction, the dimensional difference becomes small and the restricting force for rearward turning becomes stronger.

Figure 4:
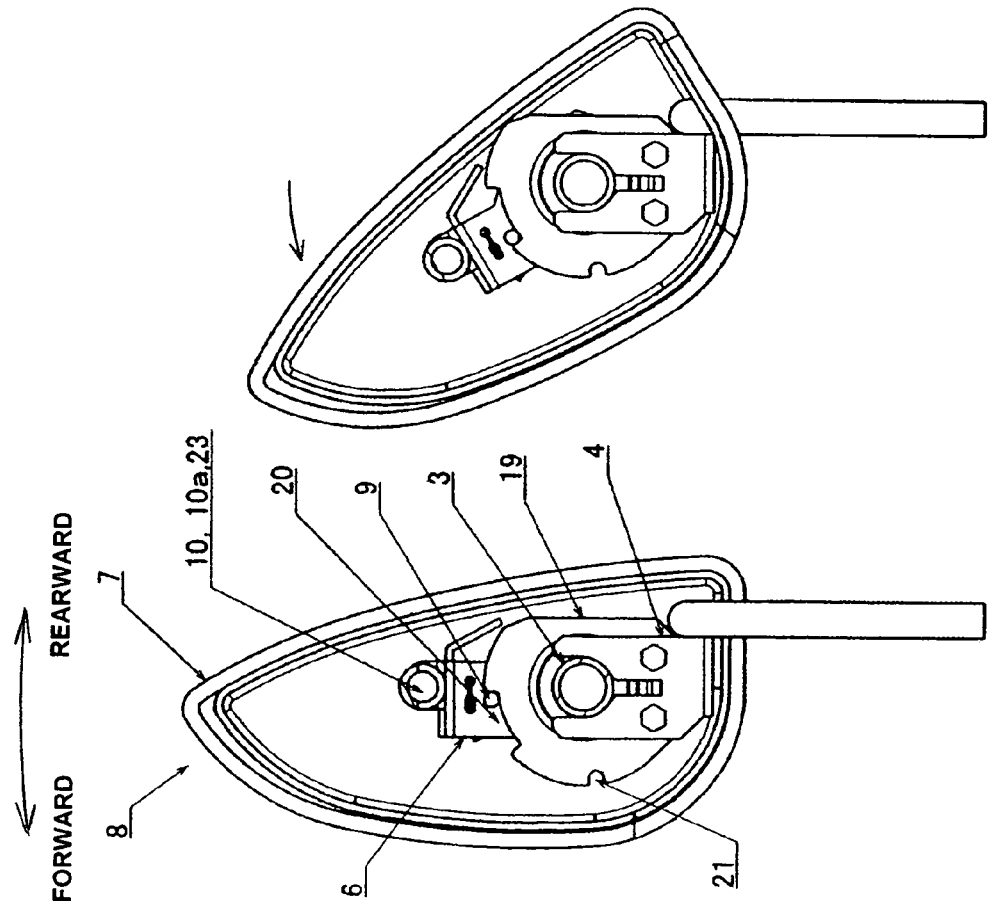
FIGS. 4(a) through 4(c) are explanatory illustrations showing how the angular adjustments are made in the headrest of the present invention.

In this example, moreover, a control plate 19 is secured to the stationary plate 4, so that the base plate 6 can be moved to a retracting position that is inclined forward approximately 90° relative to the seat back 1. FIG. 4(a) to 4(c) are side views illustrating the movement in this example (the reference numerals used in FIG. 4(a) being omitted in FIG. 4(b) and 4(c), and so hereinafter). An elongated groove 20 is formed on the circumference of the control plate 19 so as to be in a portion that corresponds to the angle adjustment range on the outer circumference of the control plate 19, which, here, is the interval from an initial position, where the base plate 6 is substantially perpendicular to the seat back 1, to the adjustment limit position, where the seat back is toppled forward approximately 30°; and in addition, a short groove 21 is also formed on the circumference of the control plate 19 so as to be at a position that corresponds to the retracting position.

Figure 5:
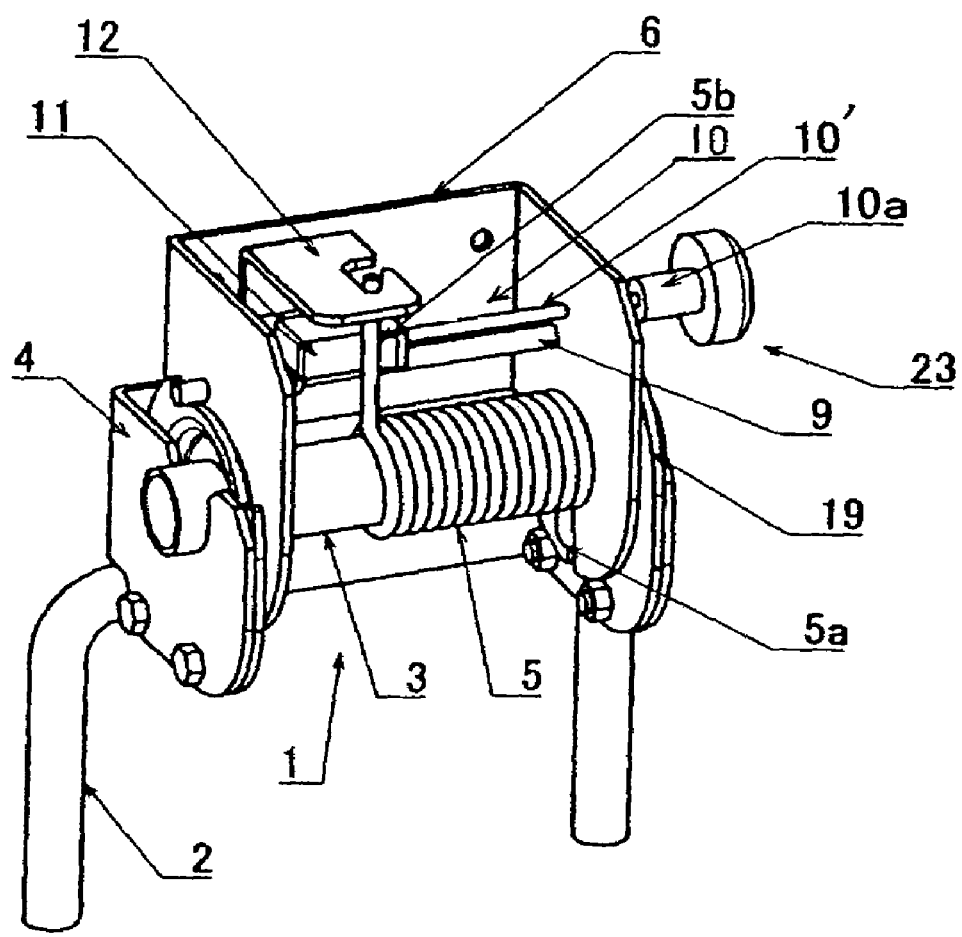
FIG. 5 is a perspective view of another example of a headrest according to the present invention.

A control rod 9, which engages into and disengages from the elongated groove 20 and short groove 21, is provided in the base plate 6. This control rod 9 configures a control member 10 and is attached to the base plate 6 so that it can be pushed into and pulled from the base plate 6. The control rod 9 is moved by manipulating a knob 10a protruding to the outside of the base plate 6 (FIG. 5). When the base plate 6 is within the angle adjustment range, the control rod 9 is in the elongated groove 20, and the movement of the base plate 6 is limited to the angle adjustment range. As a consequence, the front end and back end of the elongated groove 20 form stoppers; and even should an excessive forward or rearward load be applied to the headrest 8, the base plate 6 of the headrest 8 will only turn between the initial position and the adjustment limit position, and safety is secured. When the knob 10a is pushed in, the control rod 9 is released from the elongated groove 20, and as a result, the headrest can be turned to the retracting position.

The head-receiving member 7 is attached to the base plate 6 to form the headrest 8. In FIG. 4(a), the headrest 8 is in the initial position, and the control rod 9 is up against the back end of the elongated groove 20; as a result, further rearward turning is not occur. In FIG. 4(b), the headrest 8 is in the adjustment limit position, and the control rod 9 is up against the front end of the elongated groove 20; as a result, further forward turning is prevented. Between the initial position and the adjustment limit position, moreover, forward turning will occur with a comparatively light force, but rearward turning is restricted and will not occur unless a large force is applied (or, to put it the other way around, turning will occur with a large force), in the manner as described earlier. As a consequence, in the headrest of this structure, while rearward turning is heavy, it will nevertheless be possible, and the restricting force on rearward turning will have to be limited to some extent. In FIG. 4(c), the headrest 8 is in the retracting position, and the control rod 9 is in the short groove 21; and as a result, the headrest is held in this position.

FIG. 5 is a perspective view of an example in which the limiting of the restricting force on a rearward turning of the base plate is modified (improved).

In this structure, in addition to the configuration(s) described above, a control cam 11 for moving the free end 5b of the coil spring 5 to the loosening side is provided in the base plate 6. This control cam 11 is manipulated by a release member 10' (more specifically by the knob 10a) attached to the base plate 6. This release member 10' is linked to the control rod 9 and acts also as a control member 10. When the knob 10a is pushed in, the control cam 11 moves the free end 5b of the coil spring 5 to the loosening side and simultaneously releases the control rod 9 from the elongated groove 20. As a consequence, the headrest can be turned forward, from the initial position to the retracting position, with an extremely light force.

Figure 6:
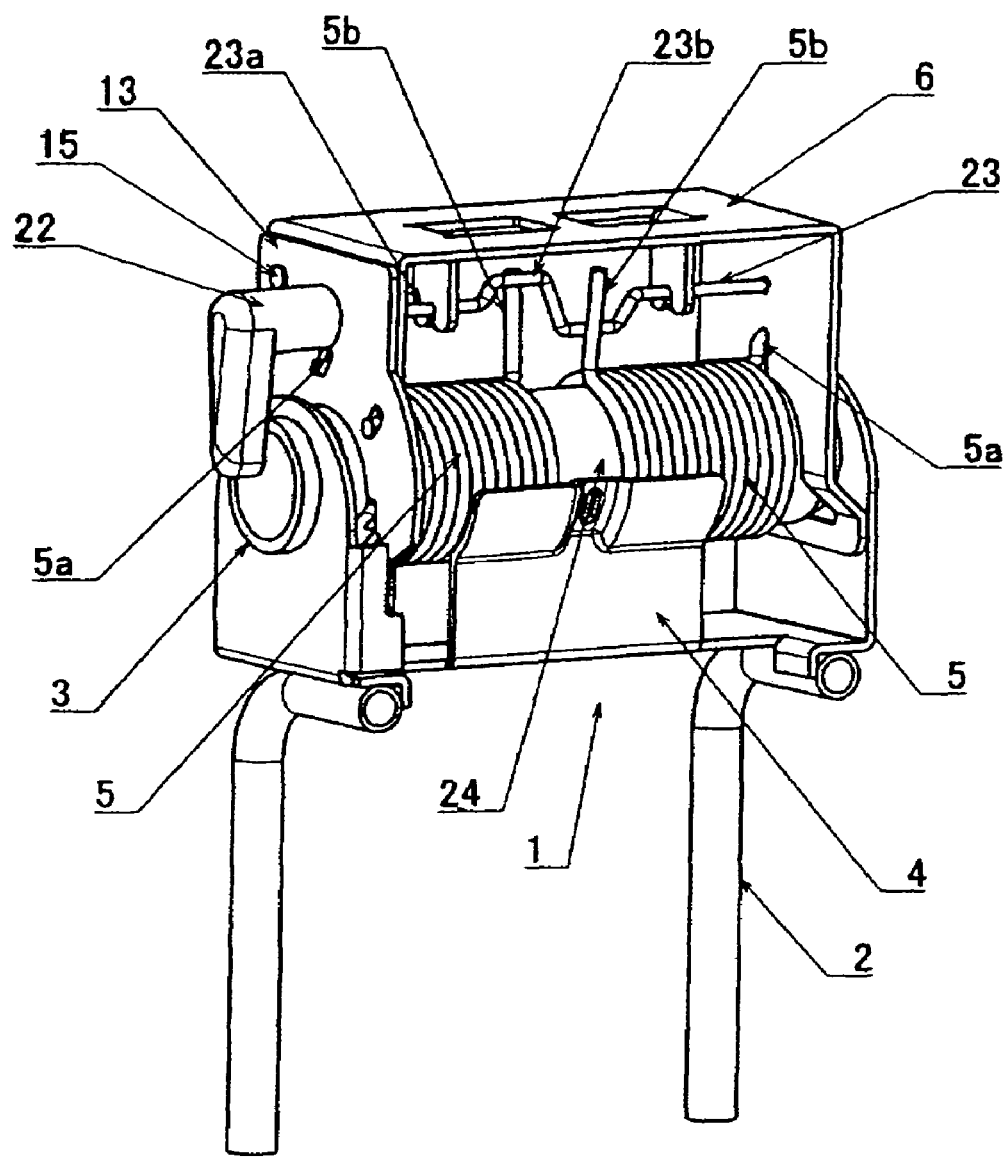
FIG. 6 is a perspective view of still another example of a headrest according to the present invention.
Figure 7:
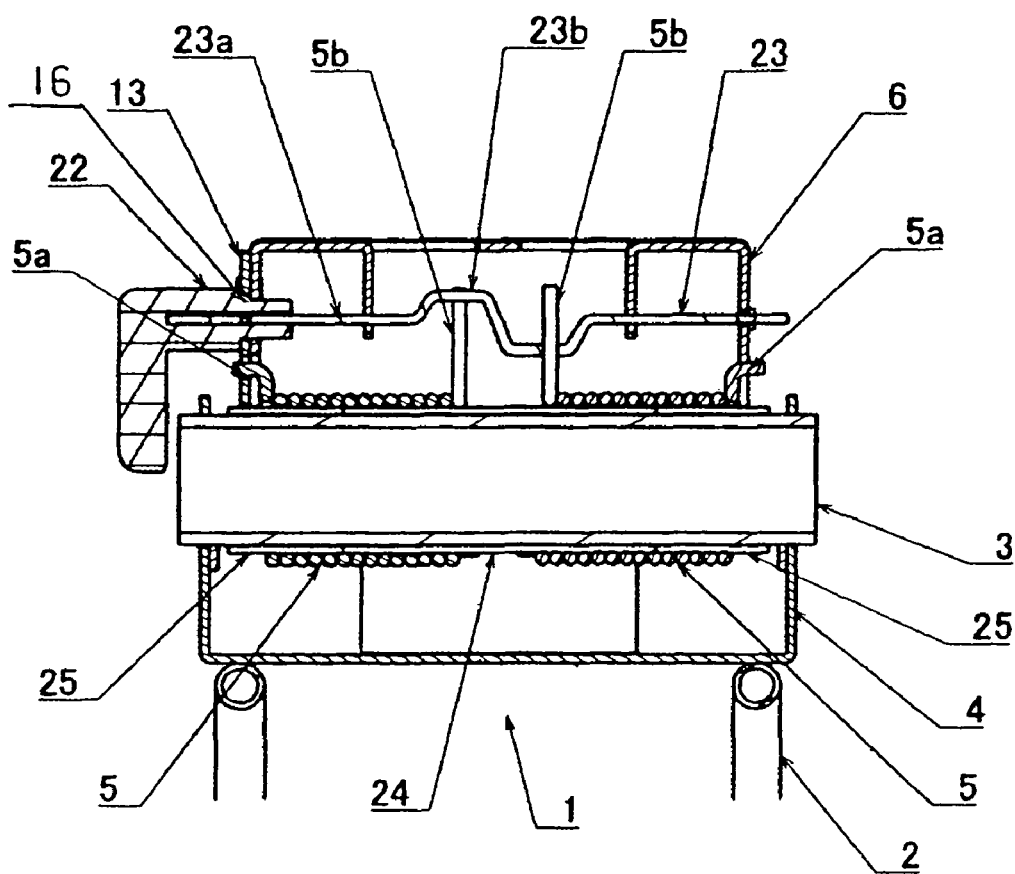
FIG. 7 is a cross-sectional view of the headrest shown in FIG. 6.

FIG. 6 is a perspective view of another example of a headrest, while FIG. 7 is a vertical section thereof.

In this structure, a center sleeve 24 is fitted on the outer circumference of the central portion of the attachment shaft 3 and an outer sleeve 25 is fitted on the outside of the central sleeve 24. Of those sleeves, the center sleeve 24 is secured to the attachment shaft 3, and the outer sleeve 25 is secured to the base plate 6, making the securing of the fixed end 5a of the coil spring 5 even stronger. As to the coil spring, moreover, two coil springs are provided, one of the left and the other on the right, and they are wound in the same direction; in addition, one end (at the outer end) of each of them is a fixed end 5a secured to the base plate 6, and the other end (at the center) of each of them is a free end 5b. A gap is provided between the two free ends 5b of the coil springs 5 in the axial direction; and these free ends 5b are extended in the axial direction, with such free ends mutually shifted fore and aft in the circumferential direction. A control member 23 (functioning also as a release member) is provided on the base plate 6 so that it can turn and so that it is located between the both free ends 5b of the springs 5. With this structure, both forward and rearward turnings of the base plate 6 are restricted.

The control member 23 in this example is a crank rod that passes through the base plate 6 in a turnable manner. A handle 22 is attached to one end of the control member (crank rod) 23 which has two crank segments 23b provided above and below relative to the crank shaft 23a thereof, and in addition each crank segment 23b is positioned between the two free ends 5b of the coil springs. In this structure, furthermore, the outer side ends of the two coil springs 5 are secured; however, the same result will be effected when the center ends thereof are secured, with the outer side ends being the free ends, and in addition the same result will be effected if the two free ends 5b and fixed ends 5a are, respectively, provided in the same orientation.

Figure 8A:
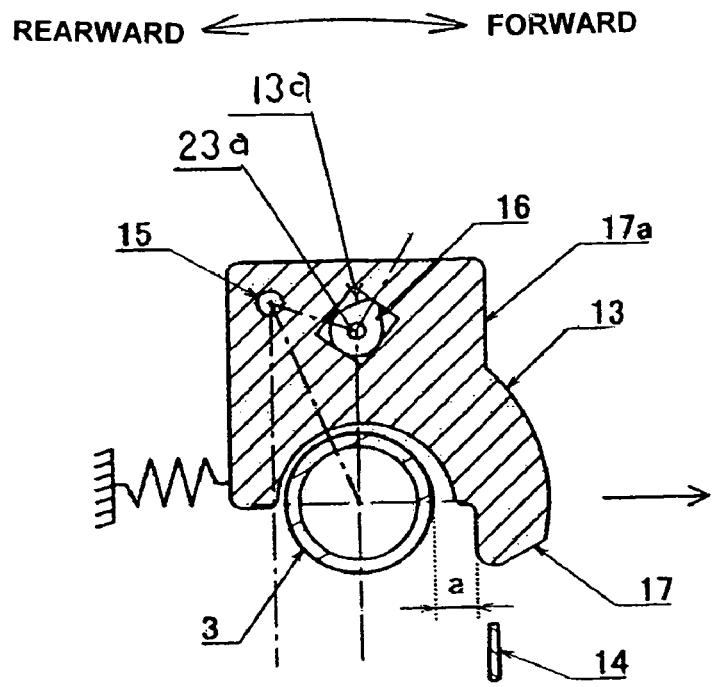
FIGS. 8(a) and 8(b) are explanatory illustrations showing how angular adjustments are made in the headrest shown in FIG. 6.
Figure 8B:
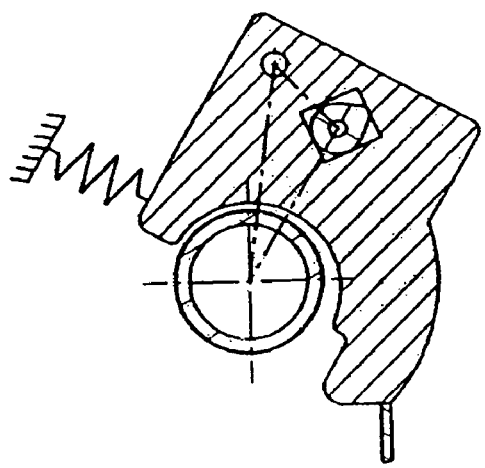

At one end of the base plate 6, moreover, a restricting plate 13, which extends to the attachment shaft 3, is attached in a turnable manner, to a support shaft 15 that extends across the base plate 6. FIGS. 8(a) and 8(b) are explanatory illustrations showing the relationship between the restricting plate 13 and the attachment shaft 3. On the forward turning side of the restricting plate 13, an abutting part 17 which protrudes forward is formed, and a gap a is formed between the inner circumference thereof and the attachment shaft 3. This gap a is larger on the forward turning side than on the rearward turning side. Meanwhile, on the crank shaft 23a, concentrically therewith, a restricting plate control cam 16 is provided, which penetrates through a window 13a provided in the restricting plate 13, so that the restricting plate 13 can be turned in linkage with the movement of the handle 22. Below the restricting plate 13 a restricting piece 14 is provided and secured to the stationary plate 4 or the like.

The action of the headrest based of this configuration will be described below. When the base plate 6 is subjected to angular adjustment, the handle 22 is turned lightly in the counterclockwise direction in FIG. 8(a); as a result, the free ends 5b of the coil springs 5 are turned by the control member 23 to the loosening side. More specifically, if the handle 22 is turned in this direction, counterclockwise, the two crank segments 23b turn the two free ends 5b together to the loosening side. As a result, the base plate 6 is turned by a light force about the attachment shaft 3; and thus when it is turned to a desired angle (at which time the free ends 5b also turn together), the handle 22 is returned to its original position.

When the handle 22 is returned to its original position, the two coil springs 5 are tightened. However, because the coil springs 5 are wound in the same direction, and the outer fixed ends 5a of them are respectively secured to the base plate 6, both forward and rearward turning are restricted, and the turning of the base plate 6 is restricted against forward and rearward turning forces resulting from shock during a collision or emergency braking. When the base plate 6 is within the angle adjustment range, even if a forward load is applied due to a reaction to an impact or the like, since the restricting plate 13 comes up against the restricting piece 14, the headrest is stopped at the adjustment limit position, and safety is secured as shown in FIG. 8(b).

FIG. 9(a) to 9(c) are explanatory illustrations showing the action when the base plate 6 is brought into the retracting position. When this is done, the handle 22 is turned greatly (approximately 45°) counterclockwise. As a result, the restricting plate control cam 16 of the control member 23 turns the restricting plate 13 rearward, and the gap a described above moves rearward to a gap b (see FIG. 9(a)). When this condition is reached, even if the base plate 6 is turned forward, a gap s develops between the restricting plate 13 and the restricting piece 14, and as a result, the abutting part 17 turns downward, passing over the restricting piece 14 (FIG. 9(b)), and the upper front edge 17a of the abutting part 17 turns until it strikes the restricting piece 14, so that the retracting position is realized (FIG. 9(c)). The feature of this structure and operation is that a restricting force act against forward turning, and in addition, both forward and rearward turnings within the angle adjustment range and turning to the retracting position can be performed easily.

Figure 10:
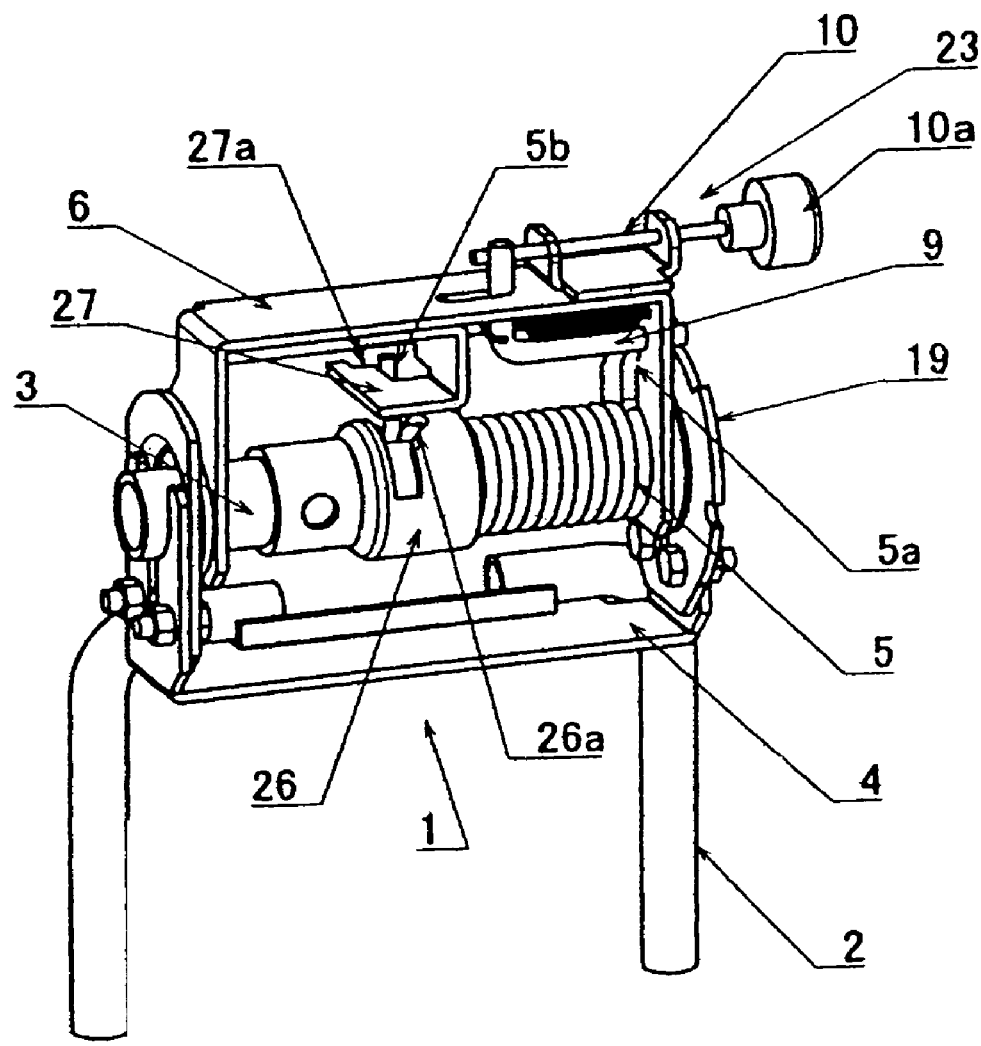
FIG. 10 is a perspective view of still another example of the headrest according to the present invention.
Figure 11:
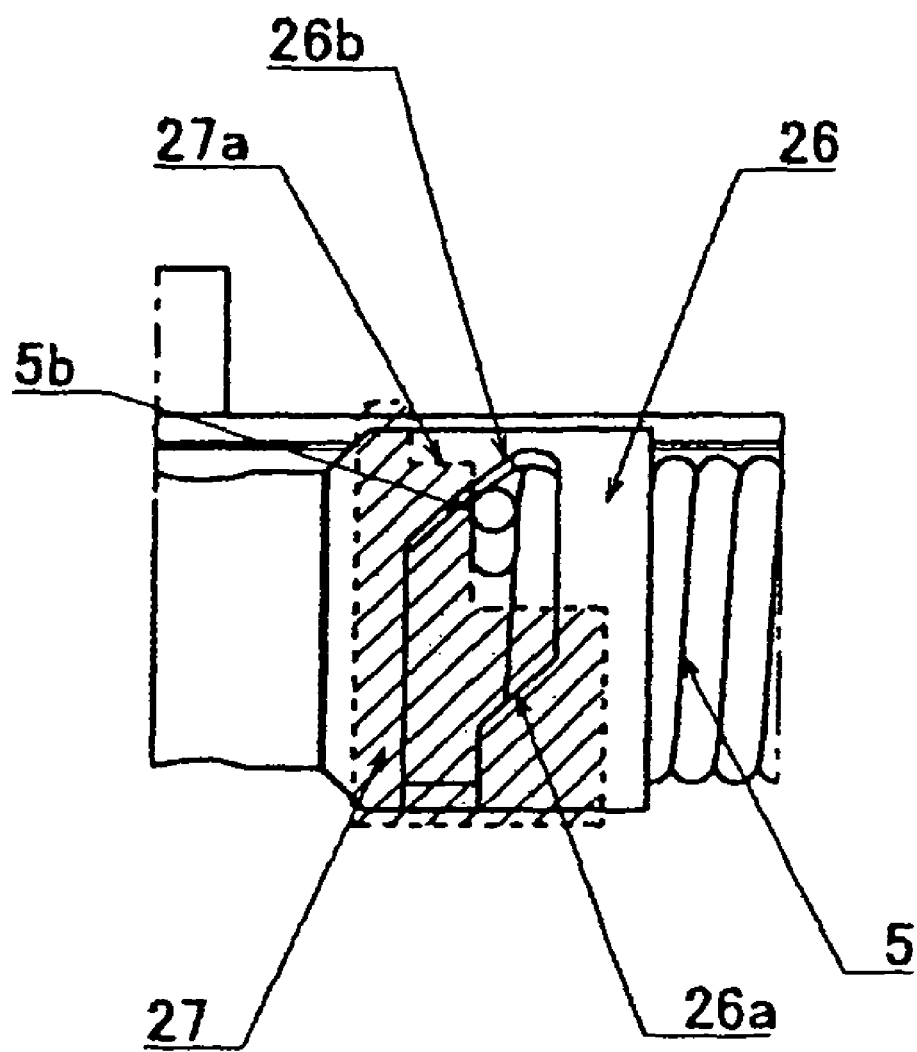
FIG. 11 is a partially enlarged view of the headrest shown in FIG. 10.

FIG. 10 is a perspective view of another example structure of the control member 10 and free end 5b of the coil spring 5, while FIG. 11 is a partially enlarged view thereof.

In this example as well, the structure includes such members as the attachment shaft 3, base plate 6, and coil spring 5. What is different, however, from the previous examples is that in this structure, for a mechanism that loosens the coil spring 5, a cam member 26 having an inclined part 26a and a latching member 27 having a retaining part 27a are provided. The cam member 26 is secured to the attachment shaft 3, and the inclined part 26a is formed in the side surface of this cam member 26 for controlling the free end 5b of the coil spring 5. On the other hand, the latching member 27 is secured to the base plate 6, the retaining part 27a is likewise formed in this latching member 27 for retaining a condition in which the free end 5b is loosened, and a key-shaped part 26b is provided in the cam member 26 for releasing the retention and restoring the original condition.

When the base plate 6 is in the angle adjustment range, the free end 5b of the coil spring 5 is not acted on by the inclined part 26a and retaining part 27a, and the condition of the coil spring 5 is not changed. As a consequence, if the base plate 6 is turned with a comparatively large force, it is possible to make a rearward angular adjustment. When the free end 5b exceeds the angle adjustment range, the free end 5b of the coil spring 5 contacts the inclined part 26a of the cam member 26, and the coil spring 5 is pushed up toward the retaining part 27a while being rewound.

In this structure, the retaining part 27a of the latching member 27 retains the free end 5b of the spring 5 in a prescribed loosened condition, after which movement is possible with a light force either in the forward or reverse direction, and, at the upper limit position (initial position) in the angle adjustment range, the initial condition is restored by the key-shaped part 26b formed similarly in the side surface of the cam member 26 and provided forward of the inclined part 26a (on the rearward side of forward turning). In this structure as well, the control plate 19 described above is secured, so that the headrest 8 is prevented from inadvertently toppling forward. The feature of this structure is that, by merely turning the base plate 6, the coil spring 5 is tightened or loosened.

Figures 12A, 12B, 12C:
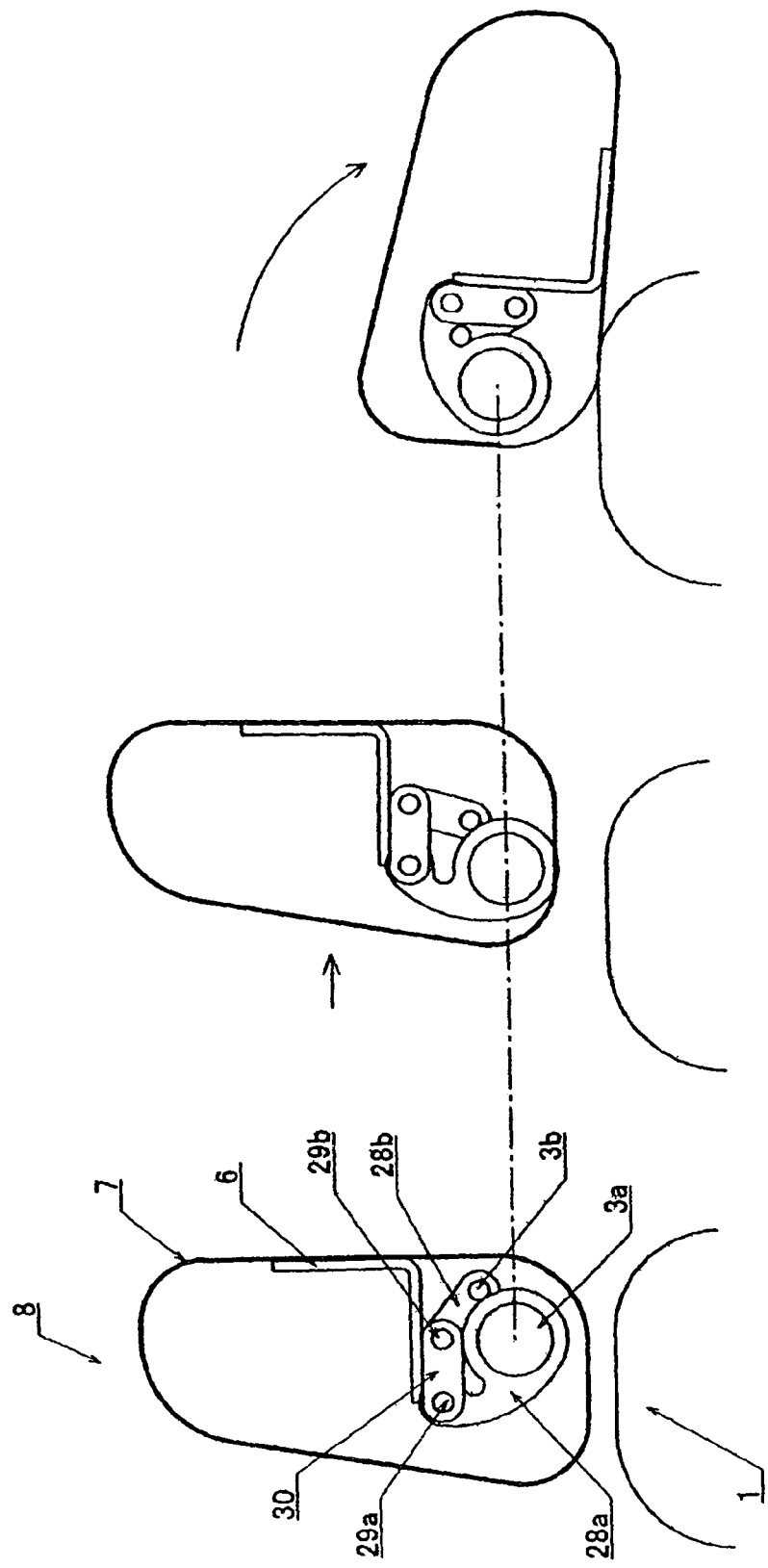
FIGS. 12(a) through 12(c) are explanatory illustrations of a headrest of the present invention that is movable in parallel or horizontal, showing how the headrest is moved forward.

FIG. 12(a) to 12(c) are side views of an example structure of the present invention in which the headrest 8 can be moved forward in parallel or horizontally within its use range. In this structure, a movable shaft 29, which links with the headrest, is provided so that the movable shaft 29 is linked by a link 28 to the attachment shaft 3, so that the movable shaft 20 can advance relative to the attachment shaft 3; and a coil spring type torque limiter comprising the coil spring 5 and control member 10 described earlier is built into the attachment shaft 3 or the movable shaft 29.

In the shown example, the attachment shaft, which is a secured (or stationary) shaft, is comprised of a first attachment shaft 3a and a second attachment shaft 3b, and the movable shaft 29 is comprised of a first movable shaft 29a and a second movable shaft 29b. The first attachment shaft 3a and the first movable shaft 29a are linked by a first link 28a, the second attachment shaft 3b and the second movable shaft 29b are linked by a second link 28b, and the first movable shaft 29a and the second movable shaft 29b are linked by a third link 30. In addition, the base plate 6 is secured to the third link 30, so that it is movable together with the head-receiving member 7.

In the headrest of this structure, when the headrest 8 is pulled forward, the first and second movable shafts 29a and 29b are moved and the third link 30 advance, while the first and second attachment shafts 3a and 3b are not moved. The positional adjustment of the headrest 8 is based on the coil spring type torque limiter described above; and though the coil spring type torque limiter can be built into either the attachment shafts 3 (3a and 3b) or the movable shafts 29 (29a and 29b), it is easier to build it into the first attachment shaft 3a, and such a configuration is most often adopted.

Figure 13C:
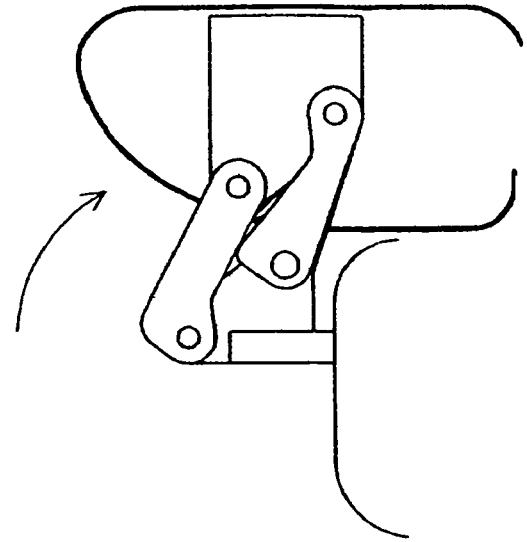
FIGS. 13(a) through 13(c) are explanatory illustrations of another headrest of the present invention that is movable in parallel or horizontal, showing how the headrest is moved forward.
Figure 13B:
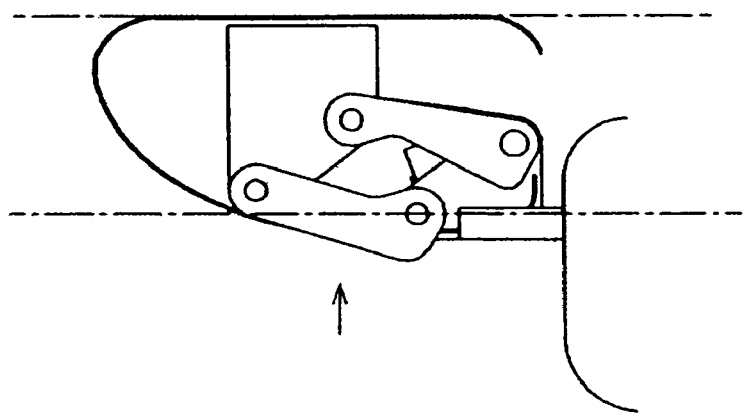
Figure 13A:
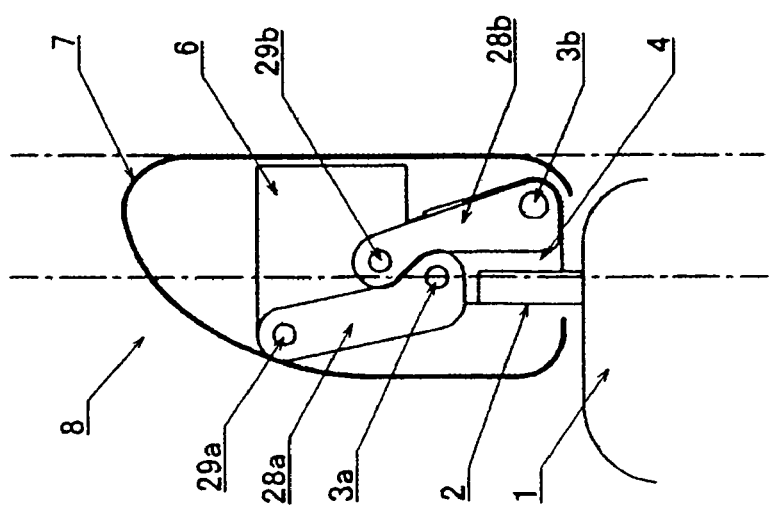

FIG. 13(a) to 13(c) are side views of a different example structure of the present invention in which the headrest 8 is moved in parallel or horizontally. In this structure, first and second attachment shafts 3a and 3b and first and second movable shafts 29a and 29b are provided, and links also are the same as those described above (except for the fact that the base plate 6 also functions as the third link 30). The first attachment shaft 3a and second attachment shaft 3b are stationary points, while the first link 28a and second link 28b are parallel links. The feature of this structure is that, by changing the positional relationship of the movable shafts 29a and 29b and the attachment shafts 3a and 3b, the headrest can be put into the retracted condition without changing the attitude of the headrest 8. In this structure as well, the coil spring type torque limiter described earlier is built into the attachment shaft 3 (3a and 3b) or movable shaft 29 (29a and 29b) is the same as the previously described example.

Figure 14:
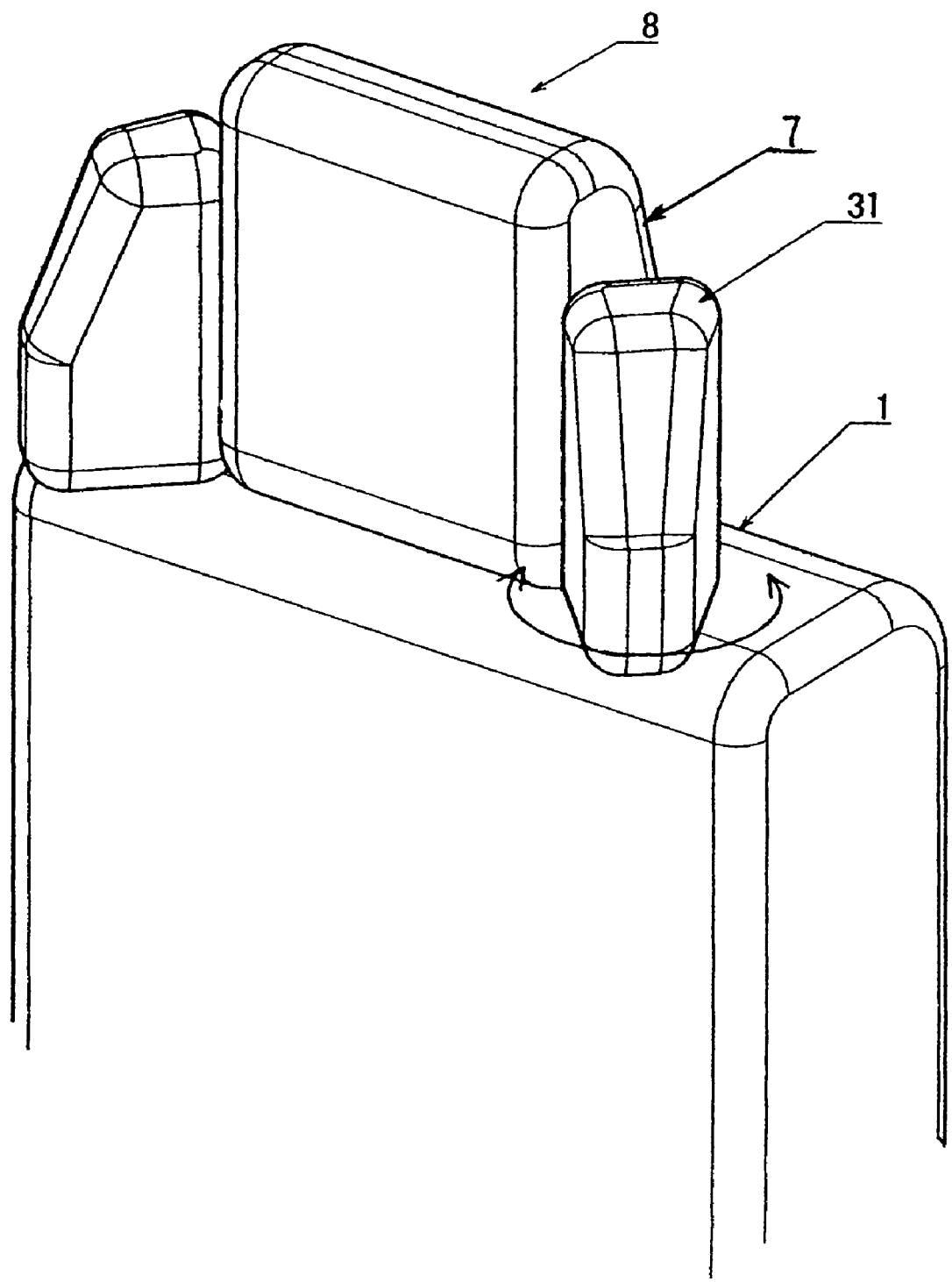
FIG. 14 is a perspective view of an example of the headrest of the present invention in which the headrest has side parts.

FIG. 14 is a perspective view of an example of a headrest that includes side parts 31 held pivotally on auxiliary stationary shafts (not shown in the drawing) which are set in the vertical direction in the head-receiving member 7 that forms the headrest 8. In this example, the side parts 31 are turned forward or rearward for their angle adjustments (thus the headrest of this type is a so-called butterfly type). In this example, the head-receiving member 7 is a stationary type and is not tiltable; and when the seat back 1 is pushed down and the passenger is reclining, the angle of the side parts 31 is adjusted so as to stabilize the attitude of the head of the passenger.

If the coil spring type torque limiter described above is provided in the auxiliary stationary shafts of this example of FIG. 14, turning rearward (downward) thereof is prevented, and angular adjustments to the optimal angle can easily be made. It is also possible to set the auxiliary stationary shafts in a diagonal direction. In addition, such a provision can also be made that a coil spring type torque limiter is provided in the head-receiving member 7 and seat back 1 so that two types of adjustment manipulations for the headrest 8 and for the side parts 31 can be made.

The invention claimed is:

1. A headrest for vehicles comprising:
a stationary plate secured to a seat back;
an attachment shaft supported by the stationary plate;
a coil spring wound about the attachment shaft, two ends of the coil spring being, respectively, a fixed end and a free end, and an inner diameter of the coil spring being smaller than an outer diameter of the attachment shaft when said spring is in a relaxed state; and
a headrest base plate attached to the stationary plate so that it is turnable forward and rearward relative to the stationary plate; wherein
the fixed end of the coil spring is provided on the base plate and the attachment shaft is secured to the stationary plate or the fixed end of the coil spring is provided on the stationary plate and the attachment shaft is provided so as to be integral with the base plate;
a winding direction of the coil spring is set in a direction that tightens the spring by a rearward turning of the base plate, thus restricting the rearward turning of the base plate;
a release member for moving the free end of the coil spring in a direction that loosens the free end of the coil spring to release the restriction on the rearward turning of the base plate is provided on the base plate;
the base plate turns through an angle adjustment range, which is from an initial position above the seat back to an adjustment limit position fixedly inclined forward, and further to a retracting position that exceeds the angle adjustment range in the forward direction;
the stationary plate is provided with a control plate; and
the base plate is provided with a control member which is linked to the release member for acting on the control plate and allowing or restricting the turning of the base plate from the initial position to the retracting position.

2. The headrest for vehicles according to claim 1, wherein
the control plate is formed with an elongated groove corresponding to the angle adjustment range and a short groove corresponding to the retracting position; and
the control member is provided with a control rod which is capable of being inserted into and withdrawn from the elongated groove and short groove;

wherein
when the control rod is withdrawn from the elongated groove by the control member, the base plate is allowed to turn as far as the retracting position, exceeding the angle adjustment range, and
when the control rod is inserted in the elongated groove, the control rod functions as a stopper at the forward end and rearward end of the angle adjustment range; and
when the control rod is inserted into the short groove, the base plate is held at the retracting position.

3. The headrest for vehicles according to claim 1, wherein:
the stationary plate or the attachment shaft is provided with a cam member which acts on the free end of the coil spring, the cam member having an inclined part for loosening the coil spring and a key-shaped part for returning the loose condition to an original condition;
the base plate is provided with a latching member for holding the loose condition of the coil spring;
wherein
when the base plate moves beyond the adjustment limit position, the coil spring is held in the loose condition by the action of the latching member and of the inclined part of the cam member; and,
when the base plate returns to the initial position, the original condition of the coil spring is restored by the key-shaped part of the cam member.

4. The headrest for vehicles according to claim 1, wherein
two coil springs having a same winding direction are provided so that both a forward turning and a rearward turning of the base plate are restricted; and
a release member is provided in the base plate for moving respective free ends of the coil springs in a loosening direction and releasing a restriction on the forward and rearward turning of the base plate.

5. The headrest for vehicles according to claim 4, further comprising:
a restricting pate linking to the control member and provided on the base plate so that the restricting plate is turnable and is movable rearward relative to the attachment shaft; and
a restricting piece which acts on the restricting plate and is provided on the stationary plate; wherein
when the control member is manipulated to move the restricting plate rearward and cause the base plate to turn forward,
even should the base plate have arrived at the adjustment limit position, the restricting plate will pass over the restricting piece and permit turning to the retracting position, and
when the base plate comes to the retracting position, a front edge of the restricting plate will come up against the restricting piece to restrict further turning of the base plate.

6. The headrest for vehicles according to claim any one of claims 1 to 5, wherein
the base plate is provided with a movable shaft and is linked by a link to the attachment shaft; and
the movable shaft is capable of, by the link, making a forward movement relative to the attachment shaft, thus allowing the headrest to move forward.

7. The headrest for vehicles according to any one of claims 1 to 5, wherein
the headrest is comprised of a head-receiving member and side parts;
the head-receiving member corresponds to the stationary plate; and
auxiliary stationary shafts are provided in a vertical direction and pivotally mount thereon the head-receiving member and the side parts.

* * * * *